US012773365B2

(12) United States Patent
Jung et al.

(10) Patent No.: US 12,773,365 B2
(45) Date of Patent: Oct. 27, 2026

(54) DISPLAY SYSTEMS AND METHODS FOR A SURFACE LYING PERSON

(71) Applicant: THE REGENTS OF THE UNIVERSITY OF CALIFORNIA, Oakland, CA (US)

(72) Inventors: Michael J. Jung, Sacramento, CA (US); Katherine Hu, Woodland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 169 days.

(21) Appl. No.: 18/269,797

(22) PCT Filed: Sep. 27, 2021

(86) PCT No.: PCT/US2021/052116
§ 371 (c)(1),
(2) Date: Jun. 27, 2023

(87) PCT Pub. No.: WO2022/146510
PCT Pub. Date: Jul. 7, 2022

(65) Prior Publication Data

US 2024/0065914 A1 Feb. 29, 2024

Related U.S. Application Data

(60) Provisional application No. 63/131,215, filed on Dec. 28, 2020.

(51) Int. Cl.
*A61G 13/12* (2006.01)
*G02B 27/01* (2006.01)

(52) U.S. Cl.
CPC ......... *A61G 13/121* (2013.01); *A61G 13/122* (2013.01); *G02B 27/0176* (2013.01)

(58) Field of Classification Search
CPC .............. A61G 13/121; A61G 13/1215; A61G 13/122; A61G 13/1225; A61G 13/1285;
(Continued)

(56) References Cited

U.S. PATENT DOCUMENTS 4,752,064 A * 6/1988 Voss .................. A61G 13/0054 5/636
5,233,713 A * 8/1993 Murphy .............. A61G 13/121 5/636

(Continued)

FOREIGN PATENT DOCUMENTS

| | | |
|---|---|---|
| CN | 106295198 A | 1/2017 |
| CN | 105138135 B | 8/2018 |

(Continued)

OTHER PUBLICATIONS

Glennon, C. et al. Use of Virtual Reality to Distract From Pain and Anxiety. Oncology Nursing Forum. Jul. 2, 2018; 45(4):545-552. DOI: 10.1188/18.ONF.545-552. PMID: 29947355.

(Continued)

*Primary Examiner* — Rachael E Bredefeld
*Assistant Examiner* — Kevin S Albers
(74) *Attorney, Agent, or Firm* — MARSHALL, GERSTEIN & BORUN LLP

(57) ABSTRACT

Systems and methods for use by a person lying in a generally prone or generally lateral position on a resting surface are disclosed. A system may include a head-mountable image display device that when used by the person at least partially occludes the person's view of a surrounding environment. The system may further include a support assembly configured to support at least a portion of the person's head in a raised position above or level with at least one of the resting surface and the head-mountable image display device. An opening may be formed in the support assembly that is sized (Continued)

to permit the person, while lying in the generally prone or generally lateral position, to view at least a portion of the head-mountable image display device through a portion of the support assembly. Methods of using such a system in a medical or other procedure are also disclosed.

25 Claims, 10 Drawing Sheets

(58) Field of Classification Search
CPC .... A61G 13/129; A61G 13/009; A61G 13/02; A61G 7/0506; A61G 7/07; A61G 7/072; A61G 9/10; A61G 9/1009; A61G 9/1054; A61G 9/1081; A61G 13/12; A61G 2200/325; A47C 20/02; A47C 20/04; A47C 20/042; A47C 7/38; A47C 7/383; A47C 20/026; Y10S 297/90; A47G 9/1054
See application file for complete search history.

(56) References Cited

U.S. PATENT DOCUMENTS

| | | | | |
|---|---|---|---|---|
| 5,778,887 | A | 7/1998 | Curtiss | |
| 5,807,114 | A | 9/1998 | Hodges et al. | |
| 5,946,749 | A * | 9/1999 | Sewell | A47C 1/143 5/507.1 |
| 5,980,256 | A | 11/1999 | Carmein | |
| 6,012,926 | A | 1/2000 | Hodges et al. | |
| 6,049,926 | A | 4/2000 | Amaral | |
| 6,186,145 | B1 | 2/2001 | Brown | |
| 6,273,865 | B1 * | 8/2001 | Perez | A61H 11/00 601/49 |
| 6,275,340 | B1 | 8/2001 | Brown | |
| 6,425,764 | B1 | 7/2002 | Lamson | |
| 6,718,582 | B1 * | 4/2004 | Tinsley | A47C 7/38 5/636 |
| 6,938,287 | B1 * | 9/2005 | Mahshie | A47C 17/66 5/735 |
| D555,251 | S | 11/2007 | Riach | |
| 7,694,370 | B1 * | 4/2010 | Lee | A61G 13/009 5/652 |
| 9,804,401 | B2 | 10/2017 | Choi | |
| 9,978,288 | B2 | 5/2018 | Lok et al. | |
| 10,286,179 | B2 | 5/2019 | Giap et al. | |
| 10,335,572 | B1 | 7/2019 | Kumar | |
| 10,492,981 | B1 | 12/2019 | Kumar | |
| 10,685,488 | B1 | 6/2020 | Kumar | |
| 11,285,066 | B1 * | 3/2022 | Kusens | A47C 7/383 |
| 2002/0184706 | A1 * | 12/2002 | Riach | A61B 6/0421 5/640 |
| 2005/0019734 | A1 | 1/2005 | Peled | |
| 2005/0216243 | A1 | 9/2005 | Graham et al. | |
| 2005/0235422 | A1 | 10/2005 | Wallace | |
| 2006/0247489 | A1 | 11/2006 | Carbis et al. | |
| 2008/0280276 | A1 | 11/2008 | Raber et al. | |
| 2009/0093685 | A1 | 4/2009 | Vu et al. | |
| 2009/0288017 | A1 * | 11/2009 | Just | A61G 13/10 715/750 |
| 2010/0198755 | A1 | 8/2010 | Soll et al. | |
| 2011/0019858 | A1 | 1/2011 | Whitehurst et al. | |
| 2012/0108909 | A1 | 5/2012 | Slobounov et al. | |
| 2013/0131439 | A1 | 5/2013 | Millman | |
| 2013/0305455 | A1 * | 11/2013 | Davis | A61G 13/1215 5/639 |
| 2016/0120725 | A1 * | 5/2016 | Slattery | A61G 13/121 5/622 |
| 2016/0206848 | A1 | 7/2016 | Glenn | |
| 2017/0273480 | A1 * | 9/2017 | Du | A61G 13/121 |
| 2018/0136486 | A1 | 5/2018 | Macnamara et al. | |
| 2018/0197337 | A1 | 7/2018 | Forthmann et al. | |
| 2019/0142328 | A1 | 5/2019 | Broderick et al. | |
| 2019/0175284 | A1 | 6/2019 | Herbelin et al. | |
| 2019/0180879 | A1 | 6/2019 | Jain et al. | |
| 2019/0206134 | A1 | 7/2019 | Devam et al. | |
| 2019/0333213 | A1 | 10/2019 | Boettger et al. | |
| 2020/0066413 | A1 | 2/2020 | Broomhall et al. | |
| 2020/0110264 | A1 | 4/2020 | Nanasawa et al. | |
| 2020/0167009 | A1 | 5/2020 | Orr et al. | |
| 2020/0178885 | A1 | 6/2020 | Orr et al. | |
| 2020/0185097 | A1 | 6/2020 | Orr et al. | |

FOREIGN PATENT DOCUMENTS

| | | | |
|---|---|---|---|
| CN | 108721753 | A | 11/2018 |
| CN | 108986888 | A | 12/2018 |
| CN | 109102862 | A | 12/2018 |
| CN | 109192278 | A | 1/2019 |
| CN | 109308946 | A | 2/2019 |
| CN | 109410337 | A | 3/2019 |
| CN | 109620185 | A | 4/2019 |
| CN | 109658772 | A | 4/2019 |
| CN | 110021445 | A | 7/2019 |
| CN | 110070944 | A | 7/2019 |
| CN | 110431636 | A | 11/2019 |
| CN | 110891638 | A | 3/2020 |
| CN | 110910513 | A | 3/2020 |
| CN | 111210911 | A | 5/2020 |
| EP | 3113682 | A1 | 1/2017 |
| EP | 2310081 | B1 | 3/2017 |
| EP | 3473181 | A1 | 4/2019 |
| GB | 2524569 | A | 9/2015 |
| JP | 2001509693 | A | 7/2001 |
| JP | 2009543611 | A | 12/2009 |
| JP | 2018516718 | A | 6/2018 |
| JP | 2020062494 | A | 4/2020 |
| KR | 20010037127 | A | 5/2001 |
| KR | 20040037608 | A | 5/2004 |
| KR | 20190015915 | A | 2/2019 |
| KR | 101964223 | B1 | 4/2019 |
| KR | 20190105788 | A | 9/2019 |
| KR | 102104202 | B1 | 5/2020 |
| WO | WO-2015134953 | A1 | 9/2015 |
| WO | WO-2017075947 | A1 | 5/2017 |
| WO | WO-2018191902 | A1 | 10/2018 |
| WO | WO-2018209275 | A1 | 11/2018 |
| WO | WO-2019026024 | A2 | 2/2019 |
| WO | WO-2019143940 | A1 | 7/2019 |
| WO | WO-2019173765 | A1 | 9/2019 |
| WO | WO-2020068681 | A1 | 4/2020 |
| WO | WO-2020217068 | A1 | 10/2020 |

OTHER PUBLICATIONS

International Search Report and Written Opinion for Application No. PCT/PCT/US21/52116, mailed Jan. 17, 2022.

* cited by examiner

DISPLAY SYSTEMS AND METHODS FOR A SURFACE LYING PERSON

CROSS-REFERENCE TO RELATED APPLICATIONS

This application is the United States National Phase of International Patent Application No. PCT/US2021/052116, filed Sep. 27, 2021, which claims priority to U.S. Provisional Application No. 63/131,215, filed Dec. 28, 2020. The disclosures of each of the foregoing which is are herein incorporated by reference in their entirety for all purposes.

FIELD OF DISCLOSURE

The present application generally relates to image display systems and methods, and, more particularly, to systems and methods facilitating the display of imagery to a person that is lying on a surface.

BACKGROUND

Head-mounted image display devices such as virtual reality headsets have grown in popularity in recent years at least partly due to their ability to immerse users in an artificial or virtual environment. Head-mounted displays tend to be relatively bulky, in part because of the various electronics they must incorporate but also because immersion generally cannot be achieved unless the device completely or substantially completely occludes the users view of surroundings. The bulkiness of head-mounted displays presents an ergonomic challenge for individuals seeking to use the device while lying face down or on their side. For instance, in order to create clearance for the display device between the user's head and the surface on which the user is lying, the user may have to adjust his or her neck and/or torso to a position that is uncomfortable and potentially unnatural.

The foregoing challenges with the use of head-mounted displays by persons lying face down or on their side can be exacerbated in scenarios where the person is undergoing a medical procedure. Here, the person may be required to lie still for an extended period of time, making it impractical for the person to hold a potentially uncomfortable body position that is needed for using the head-mounted display. Additionally, a person undergoing a medical procedure may be sedated or in a weakened state due to an illness or other medical condition, thereby further complicating the ability of the user to hold their head and/or torso in a position that allows for use of the head-mounted display while lying.

The present disclosure sets forth systems and methods embodying advantageous alternatives to existing systems and methods for head-mounted display devices that address one or more of the challenges or needs mentioned herein, as well as provide other benefits and advantages.

SUMMARY

One aspect of the present disclosure provides a system for use by a person lying in a generally prone or generally lateral position on a resting surface. The system may include a head-mountable image display device and a support assembly. When used by the person, the head-mountable image display device may at least partially occlude the person's view of a surrounding environment. The support assembly may be configured to support at least a portion of the person's head in a raised position above or level with the resting surface and/or the head-mountable image display device. An opening may be formed in the support assembly that is sized to permit the person lying in the generally prone or generally lateral position to view at least a portion of the head-mountable image display device through at least a portion of the support assembly.

Another aspect of the present disclosure provides a support assembly for use by a person lying in a generally prone or generally lateral position on a resting surface. The support assembly may include a torso support and a head support. The torso support may be positionable between at least a portion of the person's torso and the resting surface. The head support may be operably coupled to the torso support and configured to support at least a portion of the person's head in a raised position above or level with the resting surface. An opening may be alignable with one or more of the person's eyes while the person lies in the generally prone or generally lateral position with the at least a portion of the person's torso supported by the torso support and the at least a portion of the person's head supported by the head support.

A further aspect of the present disclosure provides a method of treating a person lying in a generally prone or generally lateral position on a resting surface. The method may include: (a) providing a head-mountable image display device that when used by the person at least partially occludes the person's view of a surrounding environment; (b) positioning a support assembly such that at least a portion of the support assembly is vertically between the person and the resting surface, the support assembly supporting at least a portion of the person's head in a raised position above or level with the head-mountable image display device and including an opening sized to permit the person while lying in the generally prone or generally lateral position to view at least a portion of the head-mountable image display device through at least a portion of the support assembly; and (c) displaying therapeutic imagery via the head-mountable image display device before, after, and/or during a medical procedure.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicative of the presence or absence of particular elements in any of the exemplary embodiments, except as may be explicitly delineated in the corresponding written description. Also, none of the drawings is necessarily to scale.

DETAILED DESCRIPTION

Figure 1:
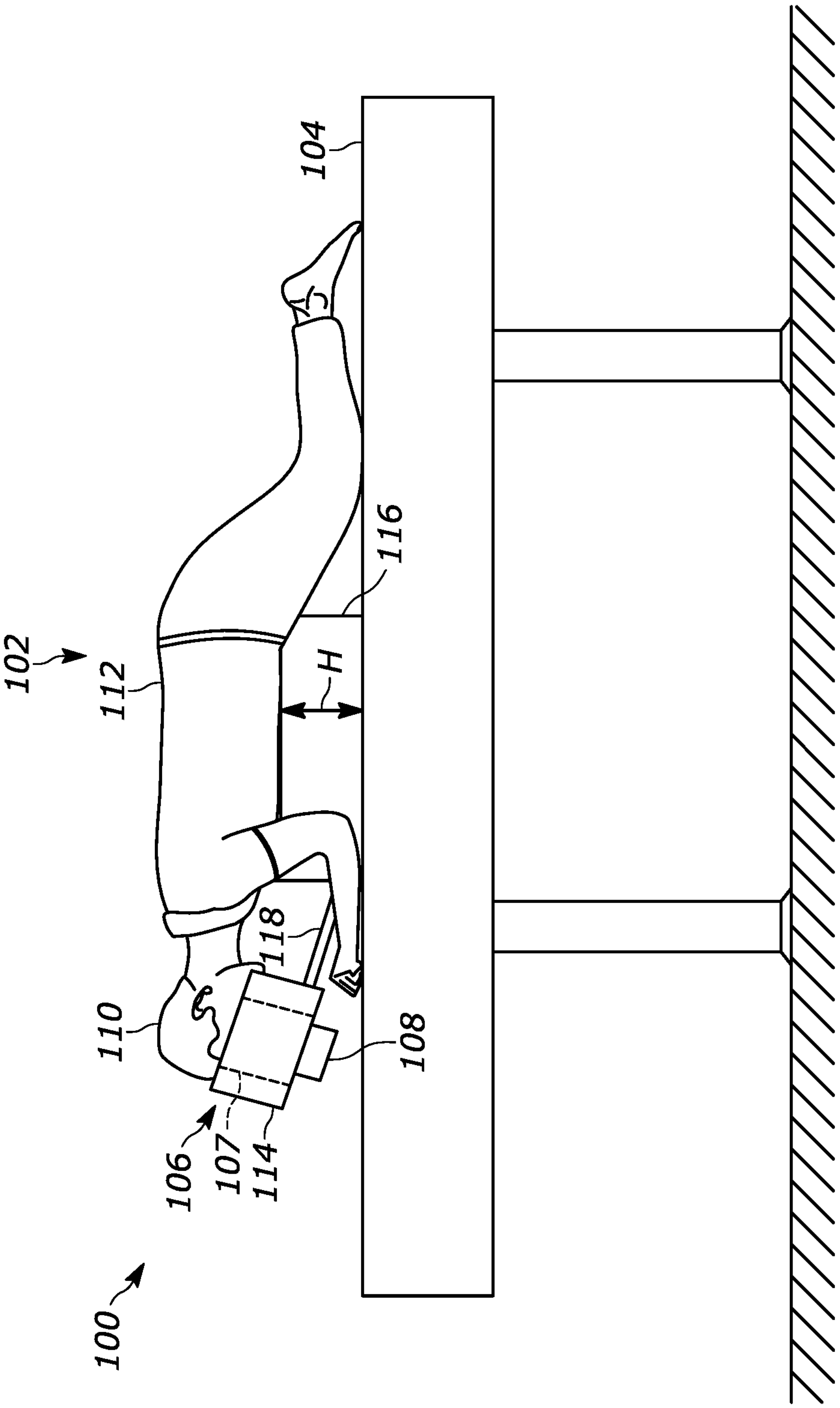
FIG. 1 is a schematic side view of a system in use by a person according to an embodiment of the present disclosure.

The present disclosure generally relates to systems and methods facilitating the use of a head-mountable display device by a person lying in a generally prone or generally lateral position on a resting surface. A person lying in such positions may need keep his or her head in a raised position above the resting surface in order to properly use a head-mountable display device. The systems and methods disclosed herein assist a person in this regard by providing support for the person's head, torso, and/or other body parts during use of the head-mountable display device. Support may also optionally be provided for the head-mountable display device so that the person is alleviated from having to support the weight of the display device. The systems and methods disclosed herein allow a person to use the head-mountable display device in a way that feels comfortable and/or natural while lying in the generally prone or generally lateral position. This, in turn, makes it feasible to use the head-mountable display device during, for example, surgery, injections, medical examinations, medically-prescribed bed rest, chiropractic procedures, massages and other medical procedures and treatments where the person is required or recommended to lie in the generally prone or generally lateral position for an extended period of time, potentially without moving. The use of a head-mountable display device in the medical context has been found to provide beneficial therapeutic effects, at least partly because the immersive effect of a head-mountable display device distracts the person from and/or mitigates pain or other uncomfortable or anxiety producing aspects of a medical procedure or treatment. Employing a head-mountable display device to display therapeutic imager during a medical procedure can supplement or be a substitute for the administration of analgesics, sedatives, anesthetics, and/or other pain and/or anxiety reliving drugs and furthermore advantageously provides a non-invasive form of pain and/or anxiety relief. The systems and methods disclosed herein are not limited to use in medical procedures and may be used in a variety of contexts and for a variety of purposes, including, for example, massage therapy, physical therapy, acupuncture, Reiki, chiropractic therapy and work, recreation, relaxation, work, hobbies, gaming, among others. Additional benefits, advantages, and uses of the disclosed systems and methods are possible and are not limited to those mentioned herein.

As used herein, the terms "generally," "substantially," "approximately," "about," and similar terms are intended to have a broad meaning in harmony with the common and accepted usage by those of ordinary skill in the art to which the subject matter of this disclosure pertains. It should be understood by those skilled in the art who review this disclosure that these terms are intended to allow a description of certain features described and claimed without restricting the scope of these features to precise numerical ranges. Accordingly, these terms should be interpreted as indicating that insubstantial or inconsequential modifications or alterations of the subject matter described and claimed are considered to be within the scope of the invention as recited in the appended claims.

As used herein, the term "generally prone position" is used to refer to any body position in which a person lies with at least a portion of the anterior side down and at least a portion of the posterior side up, including, but not limited to, a body position in which the person lies flat with the chest and/or face down and the back up, the jack knife position, the oblique position, and other similar positions.

As used herein, the term "generally lateral position" is used to refer to any body position in which a person lies with at least a portion of a lateral side down, including, but not limited to, a body position in which the person lies on one side with the top leg in front of the bottom leg and the hip and one or both knees flexed, the kidney position, the Sims' position, and other similar positions.

FIG. 1 is a schematic illustration of a system 100 for use by a person 102 lying in a generally prone position on a resting surface 104 according to an embodiment of the present disclosure. Depending on where and how the system 100 is used, the resting surface 104 may be the top surface of a bed such as a hospital bed, a table such as an operating table, a gurney, a massage table, or similar structures, or may even correspond to the floor or ground. The resting surface 104 may be generally planar (e.g., flat) and horizontal but is not required to have these characteristics. In some embodiments, an orientation of part(s) or the entirety of the resting surface 104 may be adjustable, such that the part(s) or entirety of the resting surface 104 can be inclined relative to the horizontal.

The system 100 may include at least a support assembly 106 and a head-mountable image display device 108. Generally the support assembly 106 may be configured to support the person's head 110 in a raised position vertically above the resting surface 104. In some embodiments, the support assembly 106 may additionally support the head-mountable image display device 108; whereas, in other embodiments, the head-mountable image display device 108 may be supported directly by the bed, table or other structure including the support surface 104. In some embodiments, the support assembly 106 may support the head-mountable image display device 108 at a cantilevered position laterally to the side of an edge of the support surface 104 vertically above, below, or level with the support surface 104. The support assembly 106 may include an opening 107 (shown in dashed lines in FIG. 1 to denote that it is hidden from view in FIG. 1) or multiple openings that at least partially align with the head-mountable image display device 108 and/or the person's face including, for example, one or more of the person's eyes. The opening 107 may be sized to permit the person 102, while lying in the generally prone or generally lateral position, to view a portion or the entirety of the head-mountable image display device 108 by looking through the support assembly 106. As an example, the opening 107 may provide the person with an unobstructed view of at least a display screen included in the head-mountable image display device 108. Furthermore, the support assembly 106 may be constructed of relatively lightweight materials such that the support assembly 106 is portable by a person between different treatment sites.

The support assembly 106 may be configured to support the person 102 with respect to the resting surface 104 such that the person's spine has a medically or therapeutically desired position while the person 102 lies in the generally prone or generally lateral position with the person's face aligned with the opening 107 in the support assembly 106 to view the head-mountable image display device 108. As used herein, the term "medically or therapeutically desired position" is used to refer to any position of a person's body or one or more parts of a person's body that is prescribed, selected, preselected, chosen, preferred, recommended, targeted, determined, predetermined, instructed, etc. by a doctor, physician, nurse, therapist, physically therapist, massage therapist, acupuncturist, chiropractor, and/or other healthcare professional and/or a medical guideline, clinical guideline, standard treatment guideline, clinical practice line, and/or other medical authority. As an example, the support assembly 106 may be configured to support the person's head 110, torso 112, and/or limbs such that the person's spine has a generally neutral or non-neutral position while the person lies in the generally prone or generally lateral position with the person's face aligned with the opening 107 in the support assembly 106 to view the head-mountable image display device 108. A generally neutral position of the spine may correspond to a position in which the person's spine is generally straight except for slight natural curves of the spine. As another example, the support assembly 106 may be configured to support the person's head 110, torso 112, and/or limbs so as to increase one or more interlaminar spaces. Such a configuration of the support assembly 106 may be useful, for example, in medical procedures where a loss of lordosis is desired.

Referring still to FIG. 1, the support assembly 106 may include a head support 114, a torso support 116, and a frame 118. The head support 114 generally may be configured to support the person's head 110 in a face down or face-to-the-side position. Furthermore, the head support 114 may include the opening 107 allowing the person 102 to view the head-mountable image display device 108 while lying in the generally prone or generally lateral position. As an example, the head support 114 may include a forehead end configured to touch and support the person's forehead and a chin end positionable adjacent to the person's chin, wherein the opening 107 for viewing the head-mountable image display device 108 may be generally centrally located between the forehead end and the chin head of the head support 114. As a more specific example, the head support 114, when viewed from above, may be C-shaped, U-shaped, or similar such that the closed end of the C-shape, U-shape, or similar shape corresponds to the forehead end of the head support 114. Laterally extending sides or arms of the head support 114 may support sides of the face of the person 102, including, for example, the cheekbones, zygopmatic bony areas, and/or jaw. The head support 114 may include a pillow, cushion, memory foam, or other generally soft and/or elastically deformable structure making it comfortable for the person 102 to rest his or her head against the head support 114 for an extended period of time (e.g., minutes, tens of minutes, hour(s), etc.).

In addition to supporting the person's head 102, the head support 114 may be configured to support the head-mountable image display device 108 in some embodiments. As an example, the head support 114 may incorporate one or more connector or receiving elements allowing the head-mountable image display device 108 to be coupled (e.g., removably coupled and/or adjustably coupled) to the head support 114 in a position that is generally aligned with the viewing opening 107 formed in the head support 114. The one or more connector or receiving elements may be disposed at an inwardly-facing surface(s) of the head support 114 and/or another surface of the head support 114 which does not contact the person's head 110 during use. As a more specific example, the head support 114 may have a top or first side contacting the person's head 110 and a bottom or second side opposite to the top or first side, and the head-mountable image display device 108 may be coupled to the head support 114 such that at least a portion (e.g., a display screen portion) of the head-mountable image display device 108 is positioned closer to the bottom or second side of the head support 114 than to the top or first side of the head support 114 such that the at least a portion of the head-mountable image display device 108 is offset away from (e.g., below) the top or first side of the head support 114. Alternatively, at least a portion of the head-mountable image display device 108 may be positioned level with or above the top or first side of the head support 114. In some embodiments, the head-mountable image display device 108 may not be supported by the head support 114. Instead, the head-mountable image display device 108 may be supported by the frame 118 and/or the torso support 116, or not supported by the support assembly 106 at all.

In the embodiment illustrated in FIG. 1, the head support 114 and the torso support 116 are separate structures connected via the frame 118. In other embodiments, the head support 114 and the torso support 116 may be integrated into a single, unitary (e.g., one-piece) structure. In such embodiments, the frame 118 may be omitted or may also be integrated in the structure including the head support 114 and the torso support 116. In some embodiments, the frame 118 may be omitted and the head support 114 and torso support 116, although separate structures, may be connected directly to each other.

The torso support 116 generally may be configured to support the person's torso 112 and optionally one or more limbs of the person 102. As an example, the torso support 116 when viewed from above may have a generally rectangular, oval, or other elongated shape. The torso support 116 may include a pillow, cushion, memory foam, or other generally soft and/or elastically deformable structure making it comfortable for the person 102 to rest his or her torso 112 and/or limb(s) against the torso support 116 for an extended period of time (e.g., minutes, tens of minutes, hour(s), etc.). In some embodiments, a height H of at least a portion of the torso support 116 when laid on the resting surface 104 in a position for use may be greater than or equal to a dimension (e.g., a width) measured from a front or non-viewing end of the head-mountable image display device 108 to a rear or viewing end of the head-mountable image display device 108 which contacts the person's face in use. As a consequence, the torso support 116 may hold at least a portion of the person's torso 112 at a position that is vertically higher than at least a portion of the head-mountable image display device 108, which, in turn, may facilitate a generally neutral position or other medically or therapeutically desired position of the person's spine when the person 102 lies in the generally prone or generally lateral position on the support assembly 106 and views the head-mountable image display device 108 through the opening 107 in the support assembly 106. In some embodiments, the torso support 116 may be omitted. This may be feasible, for example, in cases where the resting surface 104 is not planar and may adjust to the natural curvature of the person's body while the person lies in the generally prone or generally lateral position and in cases where the support assembly 106 is configured to attach to an edge of the support surface 104 such that the support assembly 106 hangs over the edge of the support surface 104 and the top side of the head support 114 is generally level with or slightly above the support surface 104.

In some embodiments, the height H of the torso support 116 may gradually increase when moving in a horizontal direction away from a first end of the torso support 116 adjacent to the person's feet toward a second end adjacent to the person's head 110. This gradual increase in the height H may be limited to a portion of the torso support 116 adjacent to the first end of the torso support 116; whereas, a portion of the torso support 116 adjacent to the second end of the torso support 116 may have a height that is substantially constant. The gradual increase in height H may create an incline that may, for example, facilitate a generally neutral position of the person's spine when the person 102 lies in the generally prone or generally lateral position on the support assembly 106 and views the head-mountable image display device 108 through the opening 107 in the support assembly 106.

The frame 118 may operably couple the head support 114 and the torso support 116 and maintains the relative positions of these components when they are used to support the weight of the person 102. The frame 118 may be made of a single structure or multiple, interconnected structures including, for example, rods, bars, beams plates, boards, bolts, nuts, and the like. A portion or the entirety of the frame 118 may be made of a rigid material such as, for example, metal, certain plastics, wood, composites, or similar, or any combination thereof. The material(s) used to construct the frame 118 may be more rigid than, for example, a soft material used to construct the person-interfacing portions of the head support 114 and/or the torso support 116. In addition to coupling the head support 114 and the torso support 116, the frame 118 may provide a base for the support assembly 106. As an example, a base portion of the frame 118 may be positioned between the torso support 116 and the resting surface 104. As a more specific example, the base portion of the frame 118 may include a generally planar board, plate, and/or beam(s) which can be secured to the resting surface 104 via flexible straps, cords, etc. and that may, for example, wrap around the bed, table, or other structure including resting surface 104.

In some embodiments, the frame 118 may be configured to allow the person 102 or another individual such as a healthcare professional to adjust (e.g., manually adjust) the relative positions of the head support 114 and the torso support 116. This may have the benefit of allowing one to position, orient, angle, tilt, etc. the head support 114 and/or the torso support 116 so as to accommodate the height, body shape, posture, and/or other personal measurements of the person 102 and, in at least some cases, facilitate a generally neutral position or other medically or therapeutically desired position of the person's spine when the person 102 lies in the generally prone or generally lateral position on the support assembly 106 and views the head-mountable image display device 108 through the opening 107 in the support assembly 106. As described below in more detail, the frame 118 in some embodiments may incorporate one or more adjustment mechanisms that allow one to rotate, translate, angle, tilt, and/or otherwise move the head support 114 relative to the torso support 116 and/or a base portion of the frame 118. Furthermore, in some embodiments, the frame 118 may incorporate one or more locks having a locked state preventing movement of the head support 114 with respect to the torso support 116 and/or the base portion of the frame 118 and a unlocked state permitting movement of the head support 114 with respect to the torso support 116 and/or the base portion of the frame 118.

Generally, the head-mountable image display device 108 may be an electronic device configured to display imagery, including, for example, still images, video, or any combination thereof, to a person at a close viewing distance and with at least a portion of the head-mountable image display device 108 in contact with or immediately adjacent to the person's face such that the head-mountable image display device 108 at least partially occludes the person's view of a surrounding environment. As an example, the head-mountable image display device 108 may at least substantially completely occlude the person's view of surroundings. As used herein, the term "at least substantially completely" may mean greater than 50%, or greater than 60%, or greater than 70%, or greater than 75%, or greater than 80%, or greater than 85%, or greater than 85%, or greater than 90%, or greater than 95%, or greater than 99%, or 100%, or any other suitable percentage. The head-mountable image display device 108 may or may not have a native (e.g., built-in) adjustable head strap or other personal attachment feature allowing a person to mount and/or wear the device on the person's head. When used in the system 100, it may be unnecessary for the person 102 utilize the adjustable head strap or other personal attachment feature because the head support 114, torso support 116, frame 118, or other aspect of the support assembly 106 may bear the weight of the head-mountable image display device 108. Alleviating the person 102 from having to bear the weight of the head-mountable image display device 108 may lessen the potential for the person 102 to become fatigued during use of the system 100 and may be preferred or required in certain scenarios where, for example, adding external load to the person's spine or back muscles has the potential to interfere with a medical procedure performed while the person 102 uses the system 100. In alternative embodiments, the person 102 may utilize the adjustable head strap or other personal attachment feature to wear the head-mountable image display device 108 while using the system 100.

In some embodiments, the head-mountable image display device 108 may be configured to render a virtual reality environment for the person 102. In certain such embodiments, the head-mountable image display device 108 may be a virtual reality headset including, for example, a stereoscopic display configured to convey depth perception (i.e., three dimensionality (3-D)) to the person 102, at least substantially completely 360 degree field of view (when a user is allowed to move his or head freely in all directions), head tracking sensors (e.g., gyroscopes, accelerometers, structured light systems, etc.), eye tracking sensors, and/or speakers. In some embodiments, the stereoscopic display may incorporate a liquid crystal display (LCD), a light emitting diode (LED) display, an organic light emitting diode (OLED) display, or any other suitable display. In some embodiments, the head-mountable image display device 108 may include a wired connection (e.g., HDMI, USB, etc.) and/or wireless connection to an external computing device (e.g., a personal computer, server, etc.) to, for example, receive image and/or audio signals and/or monitor vitals and/or movement of the person 102. In some embodiments, the head-mountable image display device 108 may be a commercially available virtual reality headset including, but not limited to, the Oculus Quest®, Google Cardboard®, HTC Vive®, Samsung Gear VR®, and Sony PlayStation VR®. In other embodiments, the head-mountable image display device 108 may be a commercially available augmented reality device or glasses such as, for example, Microsoft HoloLens®. In some embodiments, the head-mountable image display device 108 may have gaming capabilities and may be configured to communicate with hand-held remote controls or similar. The 3-D and/or wide display capabilities of the head-mountable image display device 108 may provide an immersive effect that distracts the person 102 from and/or ameliorates pain, anxiety, and/or other undesirable effects of a medical or other procedure performed on the person 102 while using the system 100. The head-mountable image display device 108 is not limited to a virtual reality headset and/or augmented reality device and may be any head-mountable visual or audiovisual display system.

The head-mountable image display device 108 may be configured to display content of any kind including, for example, therapeutic imagery. As used herein, the term "therapeutic imagery" is used to refer to any imagery intended to evoke feelings of relaxation, calmness, happiness, and/or other positive feelings, distract a person from pain, anxiety, discomfort, and/or other undesirable feelings and/or sensations experienced by a person undergoing a medical procedure or treatment, and/or ameliorate pain, anxiety, discomfort, and/or other undesirable feelings and/or sensations experienced by a person undergoing a medical procedure or treatment. Therapeutic imagery includes content that is specially made to achieve any of the foregoing effects, as well as content that is not specially made for achieving but nevertheless achieves any of the foregoing effects. Therapeutic imagery may be depend on the preferences or tastes of the particular person viewing the therapeutic imagery. For example, the therapeutic imagery may be the person's favorite movie or video game or pictures of the person's loved ones. Therapeutic imagery is not required to be tailored to a particular person's preferences or tastes and encompasses imagery that generally has any of the foregoing effects for a substantially large percentage of the population including, for example, a video of nature scenes such as a sunset or puppies playing.

Turning to FIGS. 2-11, additional embodiments of the above-described system will now be described. Various elements of the systems illustrated in FIGS. 2-11 may have similar or identical configurations, functions, and/or structure as elements of the system 100 described above in connection with FIG. 1. Such elements are assigned with the same reference numeral as used in FIG. 1, except incremented by 100 or a multiple thereof. A description of some of these elements is abbreviated or eliminated in the interest of conciseness.

Figure 2:
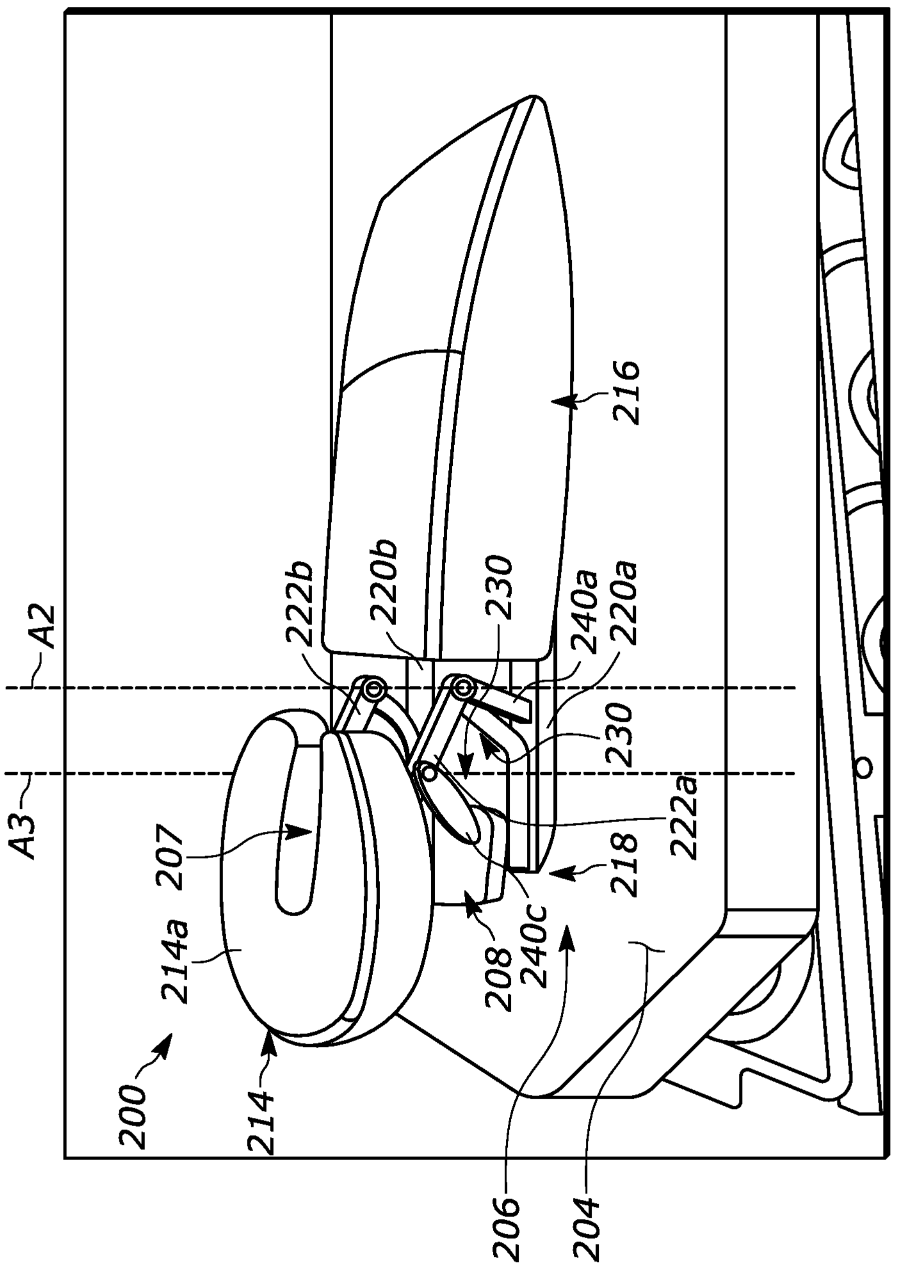
FIG. 2 is a perspective view, generally from the side, of a system according to another embodiment of the present disclosure.
Figure 3A:
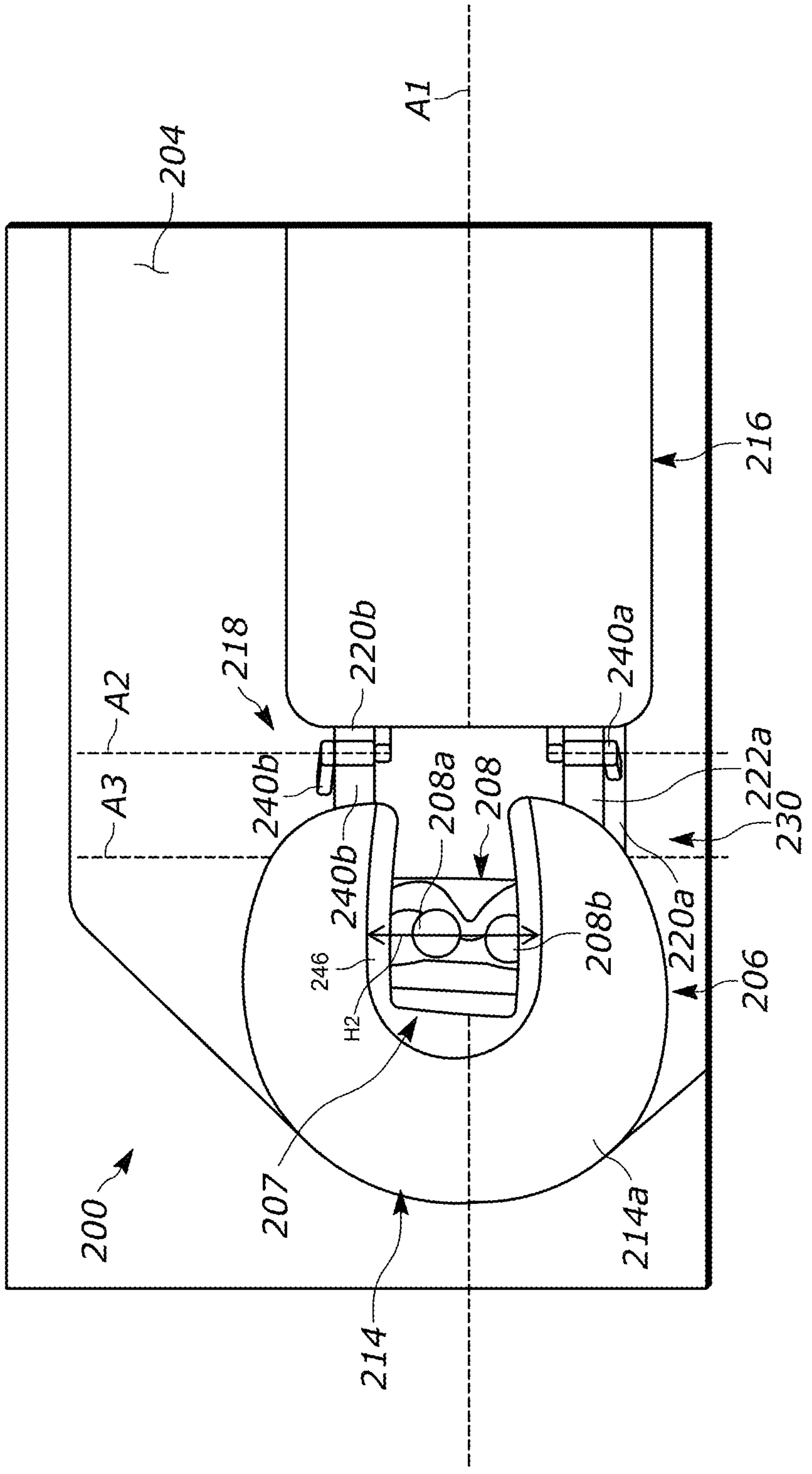
FIG. 3A is a top view of the system in FIG. 2.
Figure 3B:
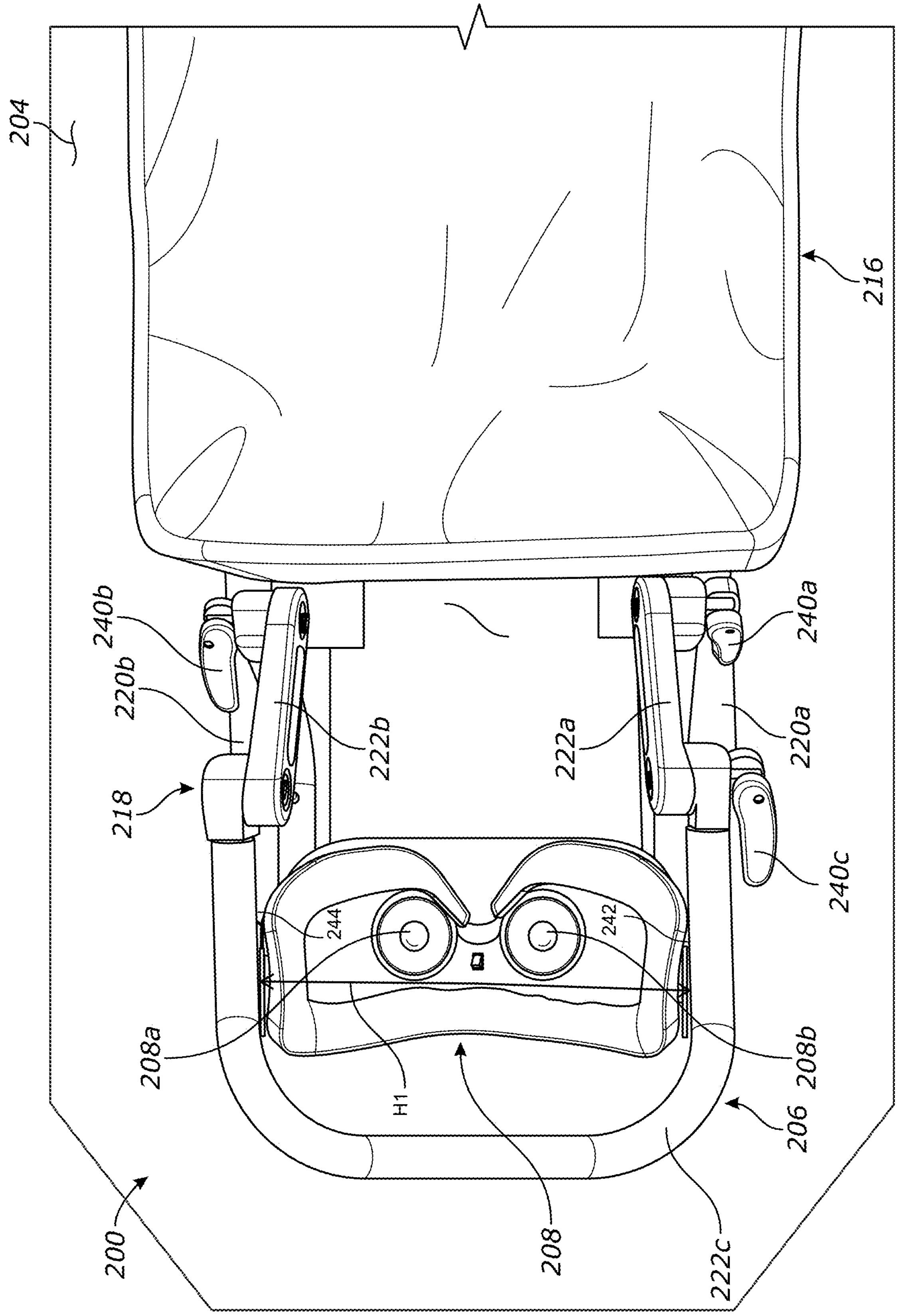
FIG. 3B is the same view as FIG. 3A, with the head support removed.
Figure 4:
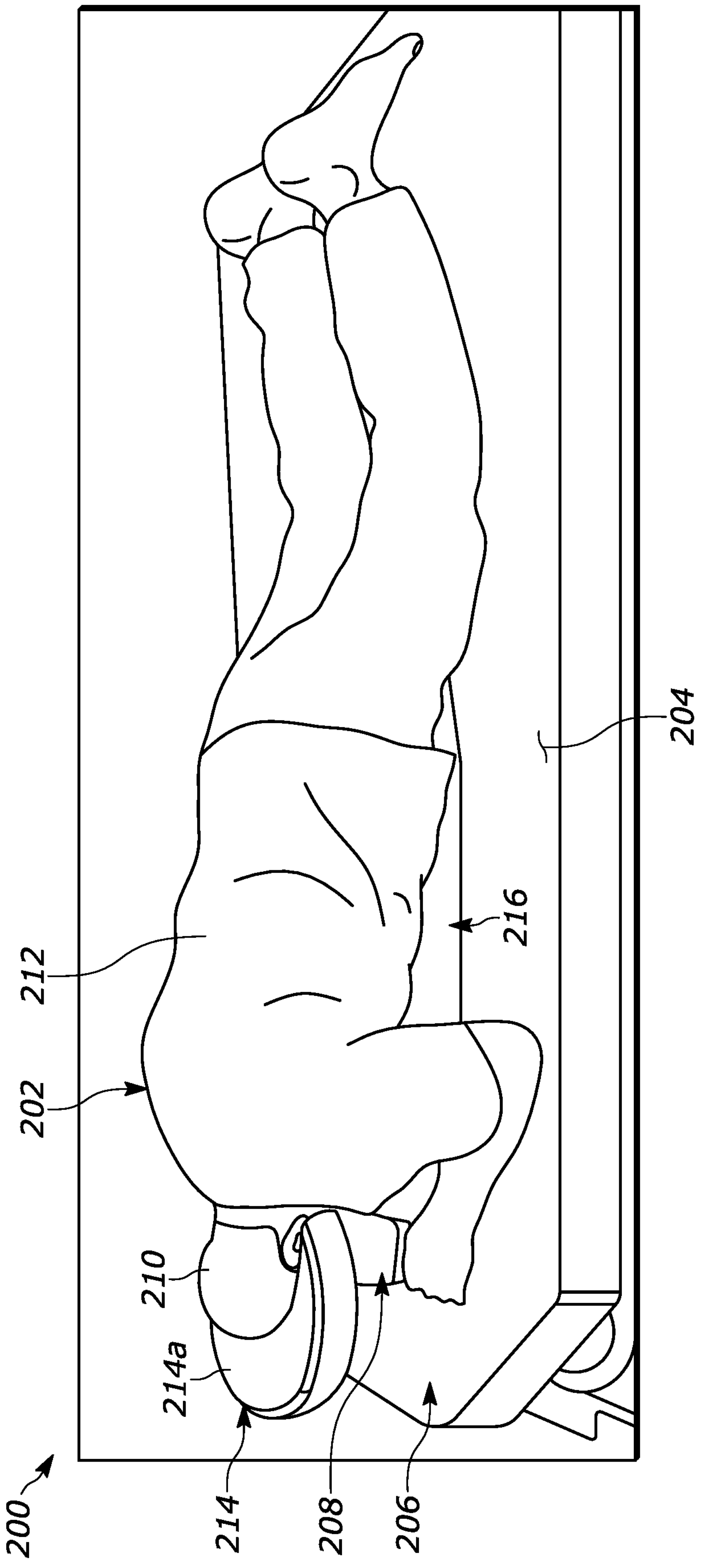
FIG. 4 is a perspective view of the system in FIG. 2 in use by a person.

FIGS. 2-4 illustrate a system 200 for use by a person 202 lying in a generally prone position on a resting surface 204. The system 200 includes a support assembly 206 and a head-mountable image display device 208. As seen in FIG. 4, the support assembly 206 includes a head support 214 configured to support the person's head 210, a torso support 216 configured to support the person's torso 212, and a frame 218 connecting the head support 214 to the torso support 216. The head-mountable image display device 208 may be a commercially available virtual reality headset device or augmented reality device such as one of those mentioned above or any other similar device. In the illustrated embodiment, the head-mountable image display device 208 is supported by the resting surface 204. However, in other embodiments, the head-mountable image display device 208 may be supported by the head support 214, the torso support 216, the frame 218, and/or another connector member such as the tray discussed below.

FIG. 3A illustrates that the head support 214 may be generally C-shaped when viewed from above and have a central opening 207. In use, the person 202 may rest his or her forehead against a forehead end 214*a* of the head support 214 and align one or more of his or her eyes with opening 207. As a consequence, a portion of the person's face, including, for example, the nose, may extend into the opening 207 in the head support 214, as seen in FIG. 4. At least a portion of the head-mountable image display device 208 is aligned with the opening 207, as seen in FIG. 3A. As an example, the at least portion of the head-mountable image display device 208 aligned with the opening 207 may include one or more lenses or viewing ports 208*a* and 208*b* for the person 202 to view a display screen housed inside of the head-mountable image display device 208. In some embodiments, the opening 207 may be dimensioned so that in use a portion of or the entirety of the head-mountable image display device 208 fits inside of the opening 207. In other embodiments, such as the one shown in FIGS. 2-4, head-mountable image display device 208 may not fit inside of the opening 207 and a rear end of head-mountable image display device 208 is arranged immediately adjacent to or level with a bottom side of the head support 214.

Referring to FIGS. 2, 3A, and 3B, the frame 218 may include a plurality of interconnected beams and/or other structural members. The interconnected structural members may include base beams 220*a* and 220*b* which are generally parallel to a longitudinal axis A1 of the torso support 216, positionable between the torso support 216 and the resting surface 204, and extend along at least substantially completely an entire length of the support assembly 206. The interconnected structural members may also include articulating arms 222*a*, 222*b*, and 222*c*, which collectively or individually define an adjustment mechanism 230 permitting one to manually adjust a position (e.g., a vertical position and/or a horizontal position) and/or orientation (e.g., angle) of the head support 214 with respect to the torso support 216. The articulating arms 222*a* and 222*b* may each be hinged or otherwise pivotably connected to a respective portion of the frame 218 to permit a person to rotate the articulating arms 222*a* and 222*b*, and thus the head support 214, about a rotational axis A2. The articulating arm 222*c* may be hinged or otherwise pivotably connected to each of the articulating arms 222*a* and 222*b* to permit one to rotate the articulating arm 222*c*, and thus the head support 214, about a rotational axis A3. In some embodiments, the rotational axes A2 and A3 each may extend generally in a horizontal direction and/or may be generally perpendicular to the longitudinal axis A1 of the torso support 216. Furthermore, in some embodiments, the rotational axes A2 and A3 may be generally parallel to each other. By rotating the head support 214 about one or more of the rotational axes A2 and A3, one may be able to manually adjust the position and/or orientation of the head support 214 so that when the person 202 lies on the support assembly 206 in a generally prone position the person's spine has a generally neutral position or other medically or therapeutically desired position.

The frame 218 may additionally include one or more locks operably coupled to the adjustment mechanism 230 and which permit an individual to selectively prevent or permit movement of the head support 214 with respect to the torso support 216. As an example, locks 240*a*, 240*b*, and 240*c* may be operably coupled to, respectively, the articulating arms 222*a*, 222*b*, and 222*c*, and each of the locks 240*a*, 240*b*, and 240*c* may have a locked state preventing rotation of its respective one of the articulating arms 222*a*, 222*b*, and 222*c* and an unlocked state permitting rotation of its respective one of the articulating arms 222*a*, 222*b*, and 222*c*. As a more specific example, each of the locks 240*a*, 240*b*, and 240*c* may include a finger tab or lever having a first position (see FIG. 2) preventing rotation of a respective one of the articulating arms 222*a*, 222*b*, and 222*c* and a second position permitting rotation of a respective one of the articulating arms 222*a*, 222*b*, and 222*c*.

As seen in FIGS. 3A and 3B, in some embodiments, the support assembly 206 may include a first lateral support surface 242 and a second lateral support surface 244, and the head support 214 may include an inner surface 246. In some embodiments, at least a portion of the first lateral support surface 242 and at least a portion of the second lateral support surface 244 may be separated by a first horizontal distance H1, a maximum horizontal separation between first and second portions of the inner surface 246 of the head support 214 may correspond to a second horizontal distance H2, and the first horizontal distance H1 may be greater than the second horizontal distance H2.

Figure 5:
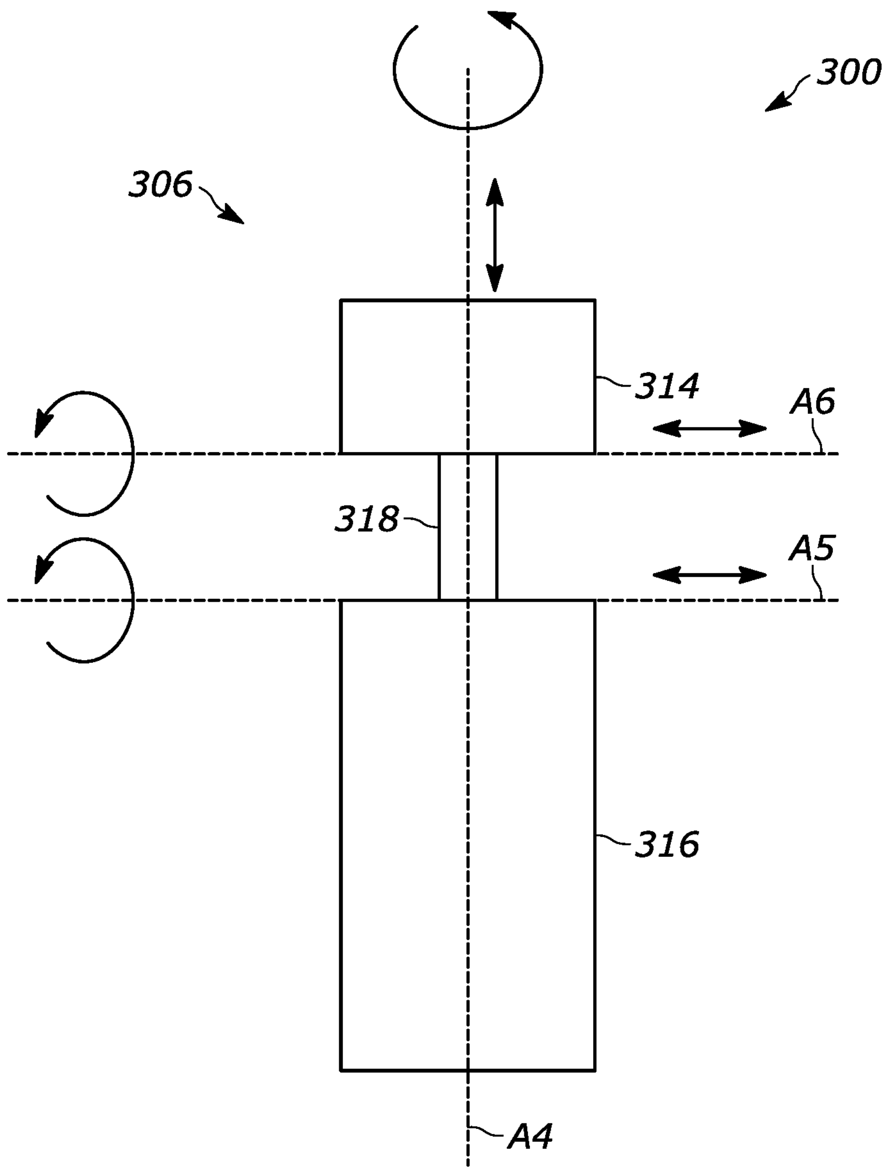
FIG. 5 is a schematic top view of system according to another embodiment of the present disclosure.
Figure 6:
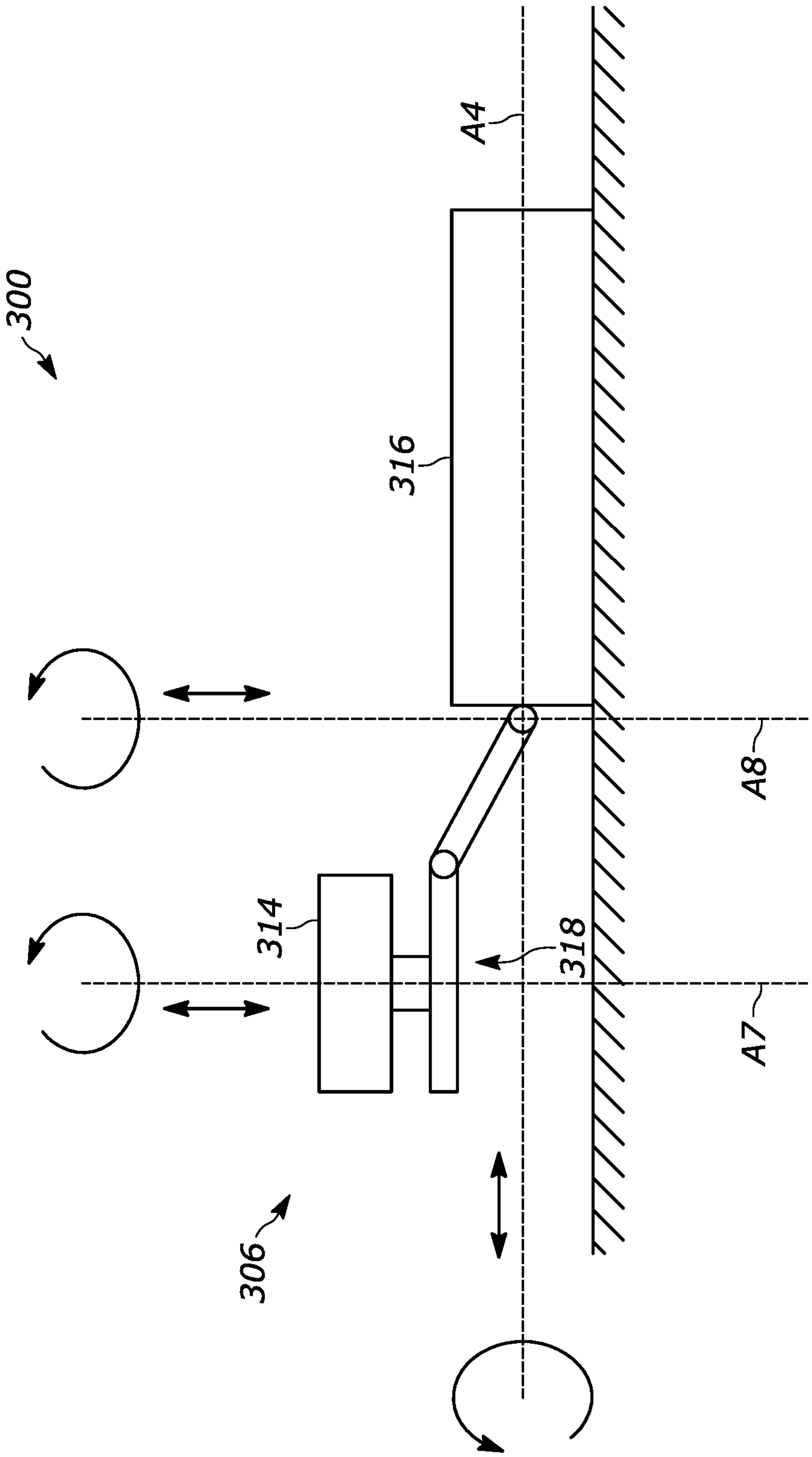
FIG. 6 is a schematic side view of the system in FIG. 5.

While the embodiment of the support assembly illustrated in FIGS. 2-4 includes an adjustment mechanism providing the head support with two degrees of freedom (namely, rotation about the axis A2 and rotation about the axis A3), other embodiments of an adjustment mechanism may provide the head support with lesser or more degrees of freedom, including one, two, three, four five, six, seven, eight, or any number of degrees of freedom. As an example, FIGS. 5 and 6 schematically illustrate another embodiment of a support assembly 306 including a head support 314 having 10 degrees of freedom. The 10 degrees of freedom may correspond to: (a) rotation of the head support 314 about a generally horizontal axis A4; (b) translation (e.g., linear movement) of the head support 314 back and forth along the generally horizontal axis A4; (c) rotation of the head support 314 about a generally horizontal axis A5; (d) translation of the head support 314 back and forth along the generally horizontal axis A5; (e) rotation of the head support 314 about a generally horizontal axis A6; (f) translation of the head support 314 back and forth along the generally horizontal axis A6; (g) rotation of the head support 314 about a generally vertical axis A7; (h) translation of the head support 314 up and down along the generally vertical axis A7; (i) rotation of the head support 314 about a generally vertical axis A8; and (j) translation of the head support 314 up and down along the generally vertical axis A8. Any one of or multiple ones of these degrees of freedom may be omitted and/or additional degrees of freedom may be included. In some embodiments, one or more of the generally horizontal axes A4, A5, and A6 may be generally perpendicular to one or more of the generally vertical axes A7 and A8. In some embodiments, the generally horizontal axis A4 may be parallel to and/or coaxial with a longitudinal axis of the torso support 316. In some embodiments, the generally vertical axis A7 may pass generally centrally through the head support 314. In some embodiments, each degree of freedom provided the support assembly 306 may include its own respective lock for selectively permitting or preventing head support movement associated with the degree of freedom. An advantage of having multiple degrees of freedom is that the position (e.g., a vertical position and/or horizontal position) and/or orientation (e.g., angle) of the head support 314 may be adjusted in a variety of ways to accommodate the unique body shapes of many persons and, if needed, achieve a generally neutral position or other medically or therapeutically desired position of a person's spine when the person lies in a generally prone or generally lateral position on the support assembly 306. It should be noted that while the axes are described as being generally horizontal or vertical in the state shown in the figures, depending on how various components of the support assembly 306 are rotated and/or translated during use, some or all of these axes change from being horizontal to vertical, or vice versa, or some other angle that is neither horizontal nor vertical.

Figure 7:
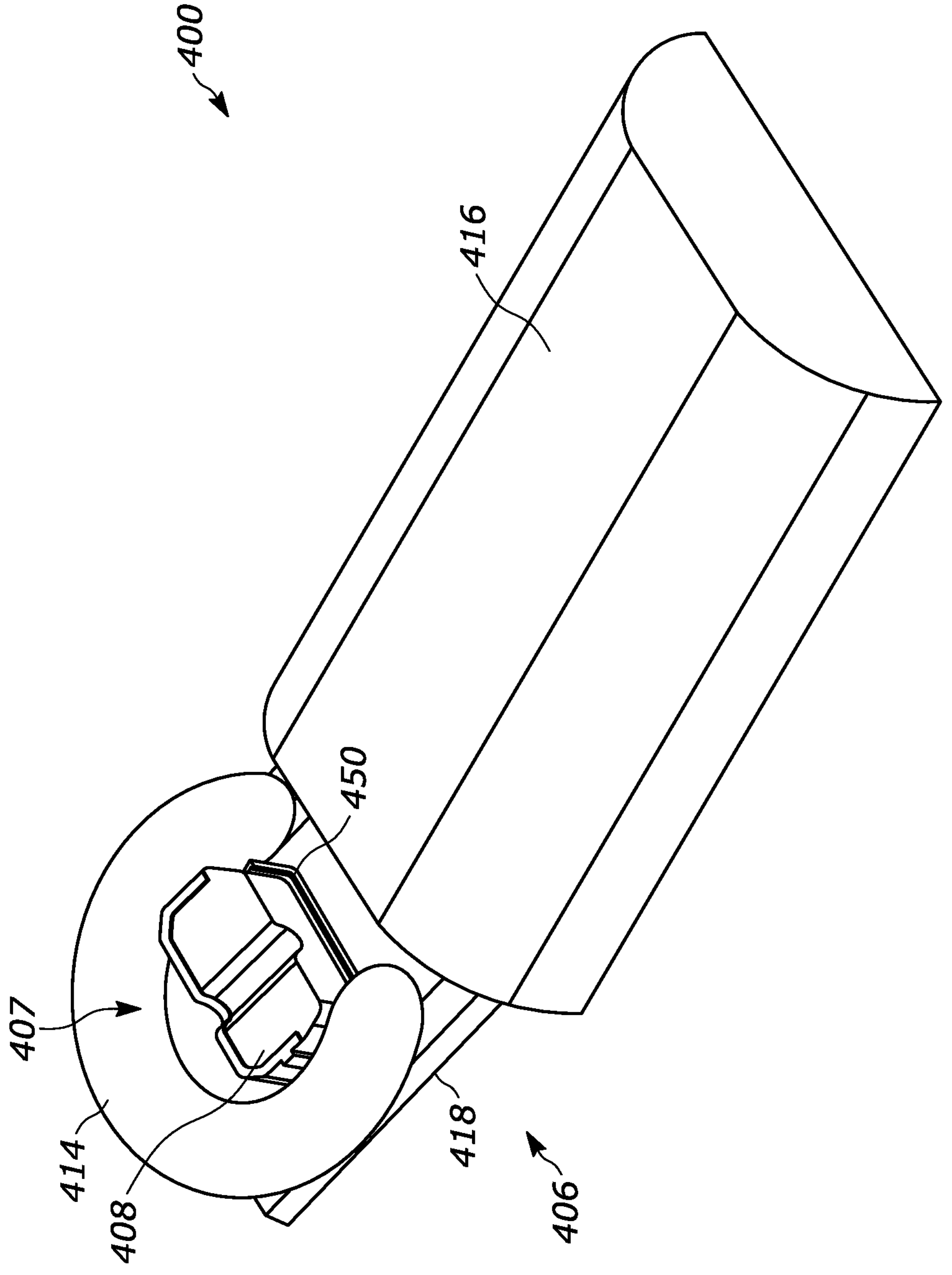
FIG. 7 is a perspective view of a system according to another embodiment of the present disclosure.
Figure 8:
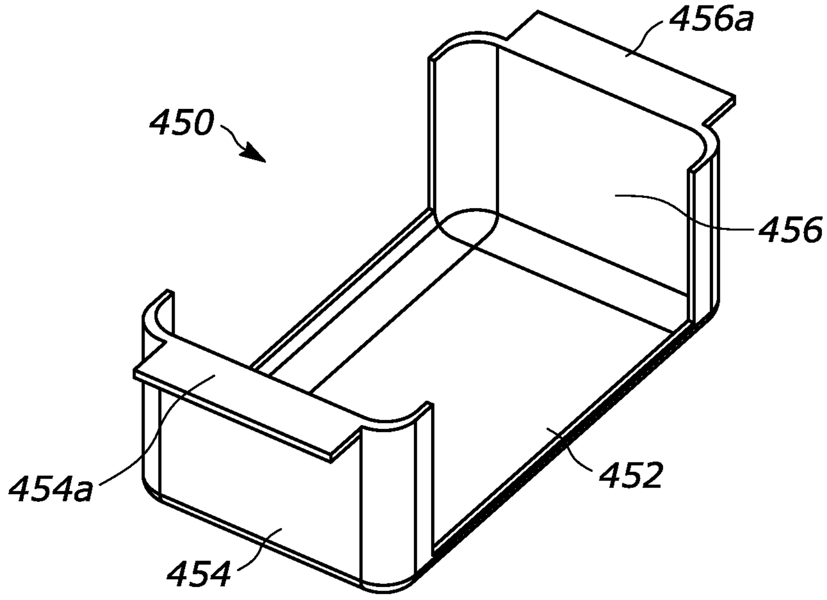
FIG. 8 is a perspective view of the tray depicted in FIG. 7.
Figure 9:
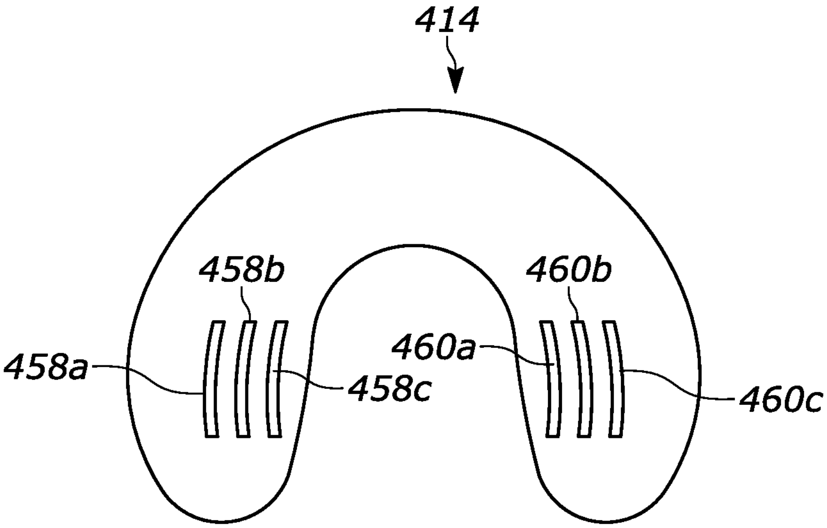
FIG. 9 is a top view of the head support illustrated in FIG. 7.

FIG. 7-9 illustrate another embodiment of a system 400 in accordance with principles of the present disclosure. The system 400 includes a connector element taking the form of a tray 450 for operably coupling the head-mountable image display device 408 to the head support 414. The tray 450 may be dimensioned so that it can inserted partially or entirely into the opening 407 in the head support 414. The tray 450 frees the person using the head-mountable image display device 408 from having to bear the weight of the head-mountable image display device 408. This may be advantageous, for example, because it reduces the likelihood of the person becoming fatigued from having to support the weight of the head-mountable image display device 408 and furthermore allows the person to relax their back muscles and/or does not require the person to posture their spine in order to support the weight of the head-mountable image display device 408. In the present embodiment, the tray 450 connects directly to the head support 414. In other embodiments, the tray 450 may additionally or alternatively connect directly to the frame 418, torso support 416, and/or another element of the support assembly 406. In some embodiments, the tray 450 may be configured to removably couple to the head support 414 and/or another element of the support assembly 406 in order to facilitate insertion of the head-mountable image display device 408 into the tray 450 and/or to allow access to the head-mountable image display device 408 while a person lies on the support assembly 406. Furthermore, in some embodiments, the tray 450 may be adjustably coupled to the head support 414 and/or other element of the support assembly 406 such that a position (e.g., a vertical and/or horizontal position) and/or orientation (e.g., angle) of the tray 450 with respect to the head support 414 may be adjusted by the person. This may have the benefit of allowing the person to adjust a distance (e.g., a focal distance) between a display screen of the head-mountable image display device 408 and the person's eyes, thereby bringing the display screen into focus for the person.

FIG. 8 shows that the tray 450 may be generally U-shaped when viewed from the side. Other shapes are also possible. The tray 450 may have a generally horizontal middle support member 452 extending between two vertically upstanding legs 454 and 456. A horizontal width of at least a portion of the middle support member 454 may be equal to or less than a horizontal width of at least a portion of the opening 407 in the head support 414. As such, the tray 450 may be configured to extend partially or entirely across the opening 407 in the head support 414. Flanges 454*a* and 456*a* may extend outwardly from the top end of each of the legs 454*a* and 456*a*, as seen in FIG. 8. In use, the flanges 454*a* and 456*a* may be received in (e.g., inserted into) respective slots or openings 458*a-c* and 460*a-c* formed in a generally inwardly-facing surface of the head support 414, as seen in FIG. 9. Multiple ones of the openings 458*a-c* and 460-*ac* may formed in the head support 414, as shown in FIG. 9, so that the vertical height of the tray 450 with respect to the head support 414 may be adjusted to accommodate the dimensions of heads of different people and/or the dimensions of different head-mountable image display devices 408. In alternative embodiments, inwardly-extending flanges or protrusions may take the place of the openings 458*a-c* and 460*a-c* and may be received in respective opening formed in the tray 450.

Figure 10:
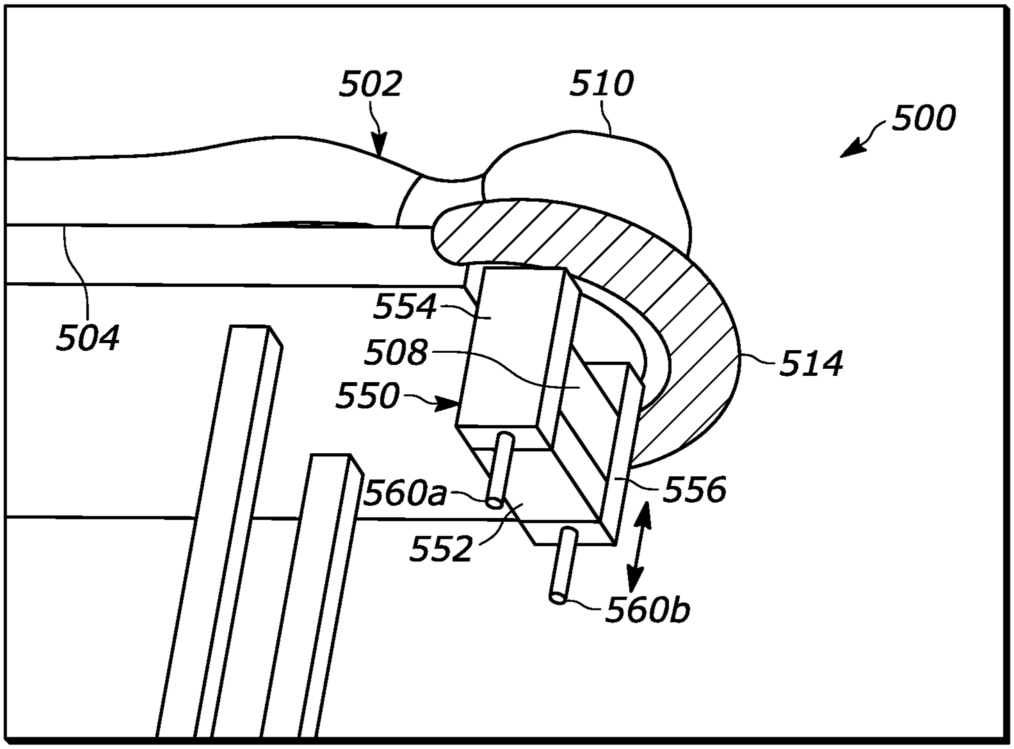
FIG. 10 is a perspective view of a head support and tray according to another embodiment of the present disclosure.

FIG. 10 illustrates another embodiment of a tray 550 for operably coupling the head-mountable image display device

508 to the head support 514. Except for the head support 514, other components of the support assembly are omitted from FIG. 10 but may be similar to or the same as those described above. FIG. 10 shows that the tray 550 includes a middle support member 552 and legs 554 and 556. The middle support member 552 is movably connected to legs 554 and 556 such that a vertical position of the middle support member 552 with respect to the head support 514 is adjustable. As an example, the middle support member 552 may include one or more outwardly extending pins which are received in and slide along respective vertical slots formed in the legs 554 and 556. Furthermore, as seen in FIG. 10, the tray 550 may include one or more rotatable adjustment knobs 560*a* and 560*b* for raising and lowering respective sides of the middle support member 552 with respect to the head support 514. Additionally, in some embodiments, a locking mechanism may be included to the lock the middle support member 552 at a desired height once adjusted.

Figure 11:
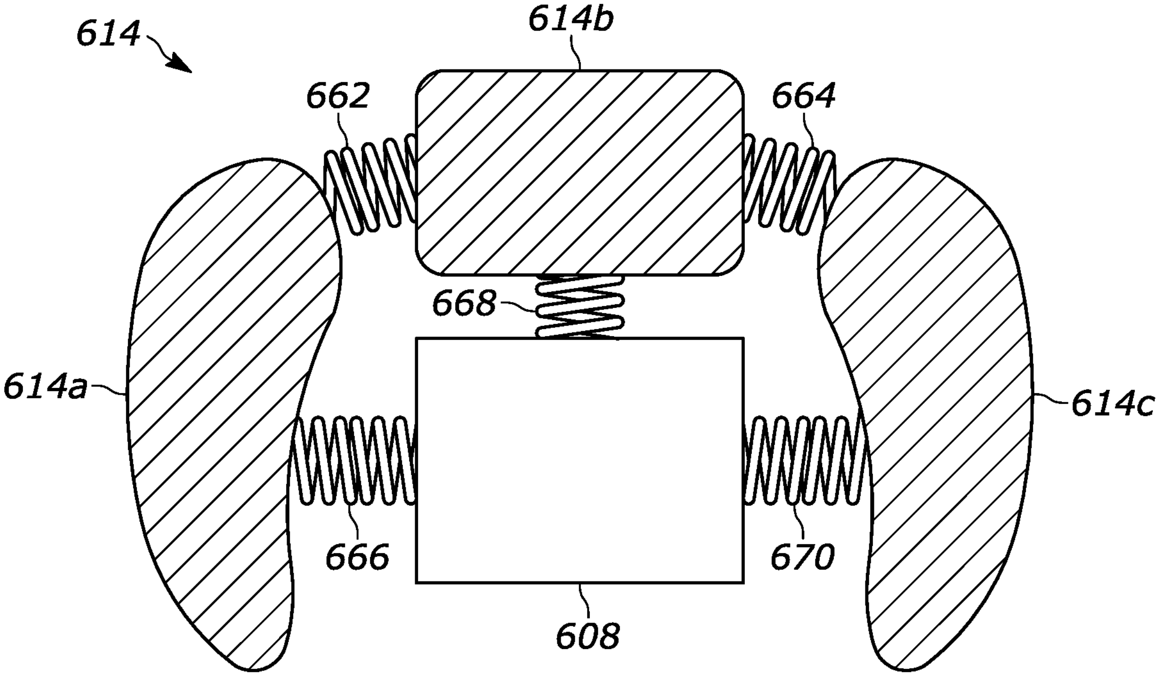
FIG. 11 is a perspective view of a head support according to another embodiment of the present disclosure.

While the foregoing embodiments of the head support generally have a permanent shape, besides slight deformations that may occur as a result of the person pressing their head against a soft portion of the head support, other embodiments of the head support may have a shape that is adjustable. This may allow for changing the shape of the head support to accommodate the dimensions of heads of different people and/or the dimensions of different head-mountable image display devices. For example, FIG. 11 schematically illustrates a head support 614 constructed of three interconnected cushions 614*a*, 614*b*, and 614*c*. A front end of the cushion 614*a* may be adjustably coupled via a coupling 662 to a first lateral side of the cushion 514*b* and a front end of the cushion 614*c* may be adjustably coupled via a coupling 664 to a second lateral side of the cushion 614*b*. Additionally, as shown in FIG. 11, the cushions 614*a*, 614*b*, and 614*c* may each be adjustably coupled to the head-mountable image display device 608 or a tray (not illustrated) for supporting the head-mountable image display device 608 via, respectively, couplings 666, 668 and 670. The couplings 666, 668, and 670 may allow one to adjust and fix the position and/or orientation of the head-mountable image display device 608 with respect to the head support 614. In some embodiments, one or more of the couplings 662-670 may include an elastic or resilient member (e.g., a spring, living hinge, memory foam, shape memory member, bendable member, flexible member, etc.) to the desired adjustment to the shape of the head support 614 and/or position and/or orientation of the head-mountable image display device 608. Additionally or alternatively, one or more of the couplings 662-670 may include various rigid components which are movable with respect to each other, including, for example, a pin-and-slot arrangement, to provide the desired adjustment to the shape of the head support 614 and/or position and/or orientation of the head-mountable image display device 608. In some embodiments, only the couplings 662 and 664 may be included and the couplings 666, 666, and 668 may be omitted, or vice versa.

Methods of using the systems disclosed herein will now be described. While the following primarily discusses the disclosed methods in context of the system 200, the disclosed methods can be used with any of the systems disclosed herein, where feasible. Furthermore, the order or sequence of any method steps described below may be varied or re-sequenced in any manner according to alternative embodiments.

The systems disclosed herein have a variety of advantageous uses including, but not limited to, methods of treatment (e.g., methods of medical treatment) where a person (e.g., a patient) is required or recommended to lie in a generally prone or generally lateral position on a resting surface while the treatment is administered. Such treatments include, for example, surgical procedures, injections, biopsies, medical examinations, medically-prescribed bed rest, medical procedures where a loss of lordosis is desired, chiropractic procedures, massages, among others. Methods of treatment that may cause a person to feel discomfort, pain, anxiety, and/or other negative feelings and/or sensations particularly benefit from the systems described herein for the reasons mentioned below.

As an initial step in using the system 200 in a method of treatment, a user may position the support assembly 206 on the resting surface 204 with the head support 214 and/or, if it is included, the torso support 216 facing generally upwards. The user may be a healthcare professional (including, but not limited to, e.g., a doctor, physician, nurse, caregiver, therapist, physical therapist, massage therapist, acupuncturist, chiropractor, and the like), the person 202, and/or another individual or group of individuals. Next, the head-mountable image displace device 208 may be aligned, horizontally and/or vertically, with the opening 207 in the head support 214. In the embodiment which includes the system 200, this may involve horizontally positioning the head-mountable image displace device 208 on the resting surface 204 such that it is arranged directly beneath the opening 207 in the head support 214 and such that a display screen portion of the head-mountable image displace device 208 faces generally upwards. In embodiments where the support assembly 206 includes a connector member (e.g., the tray 450 in FIGS. 5 and 6) for attachment to the head-mountable image displace device 208, the user may insert the head-mountable image display device 208 into the connector member, or otherwise couple these components, and then couple the connector member to the head support 214 or other mating portion of the support assembly 206. Next, the user may instruct or ask that the person 202, who may be a patient, lie on the support assembly 206 such that at least a portion of the anterior portion of the person's torso 212 (e.g., the chest) touches the torso support 216 and/or at least a portion of the person's head 210 (e.g., the forehead) touches the head support 214. As a result of this step, one or more of the person's eyes may be aligned with the opening 207 in the head support 214 such that the person can view the head-mountable image display device 208 through the opening 207 in the head support 214. In alternative embodiments, for example, where the person 202 is bedridden or has reduced mobility, the support assembly 206 may be placed on a surface on which the person 202 is already lying and then the person 202 may be asked to and/or assisted with rolling on top of the support assembly 206.

Next, the user and/or the person 202 may operate the adjustment mechanism 230 to adjust the position (e.g., a vertical position and/or horizontal position) and/or orientation (e.g., angle) of the head support 214 with respect to the torso support 216. In some embodiments, the adjustment may be done in order to achieve a medically or therapeutically desired position of the person's spine including, for example, a generally neutral position of the person's spine. In operating the adjustment mechanism 230, the user and/or the person 202 may, for example: rotate the head support 214 clockwise and/or counterclockwise about one or more axes (including, e.g., along one or more generally horizontal and/or vertical axes); translate (e.g., linearly move) the head support 214 in any direction along one or more axes (including, e.g., along one or more generally horizontal and/or vertical axes); and/or otherwise move the head support 214 with respect to the torso support 215 and/or vice versa. In some embodiments, the process of adjusting the head support 214 and/or torso support 216 may be an iterative process that is performed until a medically or therapeutically desired and/or comfortable position of the person 202 is achieved. Furthermore, in some embodiments, some or all of the step(s) of adjusting the head support 214 and/or torso support 216 may be performed before and/or substantially simultaneously with the person 202 lying down on the support assembly 206. In embodiments where it is desired that the person lie in a generally lateral position while using the head-mountable image display device, it may be necessary to rotate the head support about a generally horizontal axis (e.g., axis A4 in FIGS. 5 and 6) such that a display screen included in the head-mountable image display device 208 has a generally vertical orientation.

Once the person 202 is positioned on top of the support assembly 206 in a desired position, the head-mountable image display device 208 may be used to display therapeutic imagery or other imagery to the person 202. As described above, the therapeutic imagery may evoke feelings of relaxation, calmness, happiness, and/or other positive feelings and/or distract a person from and/or mitigate pain, anxiety, discomfort, and/or other undesirable feelings and/or sensations. In some embodiments, the imagery may be accompanied by audio that is output through speakers integrated into or in communication with the head-mountable image display device 208. In embodiments where the head-mountable image display device 208 is operable as a gaming device, the person 202 may play or otherwise interact with the imagery that is displayed, for example, by operating hand-held remote controls in communication with the head-mountable image display device 208. While (e.g., substantially simultaneously with) the person 202 is viewing the therapeutic imagery and/or playing games via the head-mountable image display device 208, one or more medical procedures may be performed on the person 202. A non-limiting list of examples of such medical procedures includes: surgical procedures, injections, biopsies, medical examinations, medically-prescribed bed rest, medical procedures where a loss of lordosis is desired, chiropractic procedures, massages, acupuncture, and the like. In addition to and/or as an alternative to displaying the therapeutic imagery to the person 202 during the medical procedure, the therapeutic imagery may be displayed to the person 202 via the head-mountable display device 208 before and/or after the medical procedure. Having the person 202 view therapeutic imagery via the head-mountable display device 208 before, during, and/or after the medical procedure advantageously may supplement or be a substitute for the administration of analgesics, sedatives, anesthetics, and/or other pain and/or anxiety reliving drugs.

From the foregoing, it can be seen that the present disclosure advantageously provides systems and methods that facilitate the comfortable use of a head-mountable display device by a person lying on a surface in a generally prone or generally lateral position. This creates an abundance of opportunities to use a head-mountable display device in non-conventional contexts, including, but not limited to, medical procedures, where until now use of the head-mountable display device may not have been considered due to the unnatural and/or uncomfortable body positioning required to use the head-mountable display device while lying down. Other benefits and advantages will be apparent from a review of the present disclosure.

Exemplary Embodiments

Exemplary embodiments provided in accordance with the presently disclosed subject matter include, but are not limited to, the claims and the following embodiments:

Embodiment 1: A system for use by a person lying in a generally prone or generally lateral position on a resting surface, the system comprising: a head-mountable image display device that when used by the person at least partially occludes the person's view of a surrounding environment; a support assembly configured to support at least a portion of the person's head in a raised position above or level with at least one of the resting surface and the head-mountable image display device; and an opening in the support assembly sized to permit the person while lying in the generally prone or generally lateral position to view at least a portion of the head-mountable image display device through at least a portion of the support assembly.

Embodiment 2: The system of Embodiment 1, wherein the support assembly is configured to support the person with respect to the resting surface such that the person's spine has a medically or therapeutically desired position while the person lies in the generally prone or generally lateral position with the person's face aligned with the opening to view the at least a portion of the head-mountable image display device.

Embodiment 3: The system of Embodiment 2, wherein the medically or therapeutically desired position of the person's spine is a generally neutral position.

Embodiment 4: The system of any one of Embodiments 1 to 3, wherein the support assembly comprises a head support and a torso support, the torso support being positionable between at least a portion of the person's torso and the resting surface.

Embodiment 5: The system of Embodiment 4, further comprising an adjustment mechanism operably coupling the head support to the torso support and permitting one to manually adjust at least one of a position and an orientation of the head support with respect to the torso support.

Embodiment 6: The system of Embodiment 5, wherein the adjustment mechanism facilitates one or any combination of: (a) rotation of the head support about one or more generally horizontal axes, (b) rotation of the head support about one or more generally vertical axes, (c) rotation of the head support about the torso support, (d) translation of the head support along one or more generally vertical axes, (e) translation of the head support along one or more generally horizontal axes, and (f) translation of the head support toward and away from the torso support.

Embodiment 7: The system of any one of Embodiments 4 to 6, further comprising a lock having an unlocked state permitting movement of the head support with respect to the torso support and a locked state preventing movement of the head support with respect to the torso support.

Embodiment 8: The system of any one of Embodiments 4 to 7, further comprising a first arm and a second arm each operably coupling the head support to the torso support, wherein at least a portion of the opening is positioned laterally between the first arm and the second arm.

Embodiment 9: The system of any one of Embodiments 1 to 8, further comprising a tray for holding the head-mountable image display device in a position aligned with the opening.

Embodiment 10: The system of Embodiment 9, wherein the tray is at least one of adjustably connected to the support assembly and removably connected to the support assembly.

Embodiment 11: The system of any one of Embodiments 1 to 10, wherein the head-mountable image display device comprises at least one of a virtual reality headset, an augmented reality device, and an audiovisual display system.

Embodiment 12: The system of any one of Embodiments 1 to 11, wherein the head-mountable image display device comprises an adjustable strap for securing the head-mountable image display device to the person's head.

Embodiment 13: A support assembly for use by a person lying in a generally prone or generally lateral position on a resting surface, the support assembly comprising: a torso support positionable between at least a portion of the person's torso and the resting surface; a head support operably coupled to the torso support and configured to support at least a portion of the person's head in a raised position above or level with the resting surface; and an opening alignable with one or more of the person's eyes while the person lies in the generally prone or generally lateral position with the at least a portion of the person's torso supported by the torso support and the at least a portion of the person's head supported by the head support.

Embodiment 14: The support assembly of Embodiment 13, wherein the torso support and the head support are configured to support the person with respect to the resting surface such that the person's spine has a medically or therapeutically desired position while the person lies in the generally prone or generally lateral position with the person's face aligned with the opening in the head support.

Embodiment 15: The support assembly of any one of Embodiments 13 or 14, further comprising an adjustment mechanism operably coupling the head support to the torso support and configured to allow one to manually adjust at least one of a position and an orientation of the head support with respect to the torso support.

Embodiment 16: The support assembly of Embodiment 15, wherein the adjustment mechanism facilitates one or any combination of: (a) rotation of the head support about one or more generally horizontal axes, (b) rotation of the head support about one or more generally vertical axes, (c) rotation of the head support about the torso support, (d) translation of the head support along one or more generally vertical axes, (e) translation of the head support along one or more generally horizontal axes, and (f) translation of the head support toward and away from the torso support.

Embodiment 17: The support assembly of Embodiment 16, wherein at least one of the one or more generally horizontal axes is generally perpendicular to a longitudinal axis of the torso support.

Embodiment 18: The support assembly of any one of Embodiments 13 to 17, further comprising a tray configured to receive a head-mountable image display device and operably coupled to the head support such that the head-mountable image display device is visible through the opening in the head support by the person lying in the generally prone or generally lateral position.

Embodiment 19: The support assembly of any one of Embodiments 13 to 18, wherein the head support when viewed from above is generally U-shaped or C-shaped.

Embodiment 20: A method of treating a person lying in a generally prone or generally lateral position on a resting surface, the method comprising: providing a head-mountable image display device that when used by the person at least partially occludes the person's view of a surrounding environment; positioning a support assembly such that at least a portion of the support assembly is vertically between the person and the resting surface, the support assembly supporting at least a portion of the person's head in a raised position above or level with the head-mountable image display device and including an opening sized to permit the person while lying in the generally prone or generally lateral position to view at least a portion of the head-mountable image display device through at least a portion of the support assembly; and displaying therapeutic imagery via the head-mountable image display device before, after, and/or during a medical procedure.

Embodiment 21: The method of Embodiment 20, wherein the support assembly comprises a head support and a torso support operably coupled to each other.

Embodiment 22: The method of Embodiment 21, further comprising adjusting the head support with respect to the torso support such that the person's spine has a generally neutral position while the person lies in the generally prone or generally lateral position with the person's face aligned with the opening to view the at least a portion of the head-mountable image display device.

While the present disclosure has been described in connection with various embodiments, it will be understood that the present disclosure is capable of further modifications. The present disclosure is intended to cover any variations, uses, or adaptations of the disclosed subject matter following, in general, the principles of the present disclosure, and including such departures from the present disclosure as, within the known and customary practice within the art to which the present disclosure pertains.

What is claimed is:

1. A system for use by a person lying in a generally prone or generally lateral position on a resting surface, the system comprising:

a head-mountable image display device that when used by the person at least partially occludes the person's view of a surrounding environment;

a support assembly configured to support at least a portion of the person's head in a raised position above or level with at least one of the resting surface and the head-mountable image display device, wherein the support assembly comprises a head support, a first lateral support surface disposed on a first side of the support assembly, and a second lateral support surface disposed on a second side of the support assembly, the first and second lateral support surfaces being configured to contact, respectively, first and second side surfaces of the head-mountable image display device to limit horizontal movement of the head-mountable image display relative to the head support;

an opening in the support assembly sized to permit the person while lying in the generally prone or generally lateral position to view at least a portion of the head-mountable image display device through at least a portion of the support assembly, wherein the support assembly is configured to support the head-mountable image display device in alignment with the opening, with an uppermost surface of the head-mountable image display device disposed vertically below an uppermost surface of the head support;

the head support comprising an inner surface defining at least a portion of a boundary of the opening and configured to contact the person's head during use of the head support, the inner surface comprising a first portion disposed on the first side of the support assembly and a second portion disposed on the second side of the support assembly, the first and second portions of the inner surface generally facing each other across the opening; and at least a portion of the first lateral support surface and at least a portion of the second lateral support surface being separated by a first horizontal distance;

a maximum horizontal separation between the first and second portions of the inner surface of the head support corresponding to a second horizontal distance; and the first horizontal distance being greater than the second horizontal distance.

2. The system of claim 1, wherein the support assembly is configured to support the person with respect to the resting surface such that the person's spine has a medically or therapeutically desired position while the person lies in the generally prone or generally lateral position with the person's face aligned with the opening to view the at least a portion of the head-mountable image display device.

3. The system of claim 2, wherein the medically or therapeutically desired position of the person's spine is a generally neutral position.

4. The system of claim 1, wherein the support assembly comprises a torso support, the torso support being positionable between at least a portion of the person's torso and the resting surface.

5. The system of claim 4, further comprising an adjustment mechanism operably coupling the head support to the torso support and permitting one to manually adjust at least one of a position and an orientation of the head support with respect to the torso support.

6. The system of claim 5, wherein the adjustment mechanism facilitates one or any combination of: (a) rotation of the head support about one or more generally horizontal axes, (b) rotation of the head support about one or more generally vertical axes, (c) rotation of the head support about the torso support, (d) translation of the head support along one or more generally vertical axes, (e) translation of the head support along one or more generally horizontal axes, and (f) translation of the head support toward and away from the torso support.

7. The system of claim 4, further comprising a lock having an unlocked state permitting movement of the head support with respect to the torso support and a locked state preventing movement of the head support with respect to the torso support.

8. The system of claim 4, further comprising a first arm and a second arm each operably coupling the head support to the torso support, wherein at least a portion of the opening is positioned laterally between the first arm and the second arm.

9. The system of claim 1, further comprising a tray for holding the head-mountable image display device in a position aligned with the opening, wherein at least a portion of the tray underlies at least a portion of a lowermost surface of the head-mountable image display device to support the head-mountable image display device.

10. The system of claim 1, wherein the head-mountable image display device comprises at least one of a virtual reality headset, an augmented reality device, and an audio-visual display system.

11. The system of claim 1, wherein the head-mountable image display device comprises an adjustable strap for securing the head-mountable image display device to the person's head.

12. The system of claim 1, wherein the support assembly is selectively adjustable to maintain or alter a curvature of the person's spine during a medical procedure.

13. A support assembly for use by a person lying in a generally prone or generally lateral position on a resting surface, the support assembly comprising:

a torso support positionable between at least a portion of the person's torso and the resting surface;

a head support operably coupled to the torso support and configured to support at least a portion of the person's head in a raised position above or level with the resting surface;

a first lateral support surface disposed on a first side of the support assembly;

a second lateral support surface disposed on a second side of the support assembly, wherein the first and second lateral support surfaces are configured to contact, respectively, first and second side surfaces of the head-mountable image display device to limit horizontal movement of the head-mountable image display relative to the head support;

an opening alignable with one or more of the person's eyes while the person lies in the generally prone or generally lateral position with the at least a portion of the person's torso supported by the torso support and the at least a portion of the person's head supported by the head support, wherein the support assembly is configured to support a head-mountable image display device in alignment with the opening, with an uppermost surface of the head-mountable image display device disposed vertically below an uppermost surface of the head support;

the head support comprising an inner surface defining at least a portion of a boundary of the opening and configured to contact the person's head during use of the head support, the inner surface comprising a first portion disposed on the first side of the support assembly and a second portion disposed on the second side of the support assembly, the first and second portions of the inner surface generally facing each other across the opening;

at least a portion of the first lateral support surface and at least a portion of the second lateral support surface being separated by a first horizontal distance;

a maximum horizontal separation between the first and second portions of the inner surface of the head support corresponding to a second horizontal distance; and the first horizontal distance being greater than the second horizontal distance.

14. The support assembly of claim 13, wherein the torso support and the head support are configured to support the person with respect to the resting surface such that the person's spine has a medically or therapeutically desired position while the person lies in the generally prone or generally lateral position with the person's face aligned with the opening in the head support.

15. The support assembly of claim 13, further comprising an adjustment mechanism operably coupling the head support to the torso support and configured to allow one to manually adjust at least one of a position and an orientation of the head support with respect to the torso support.

16. The support assembly of claim 15, wherein the adjustment mechanism facilitates one or any combination of: (a) rotation of the head support about one or more generally horizontal axes, (b) rotation of the head support about one or more generally vertical axes, (c) rotation of the head support about the torso support, (d) translation of the head support along one or more generally vertical axes, (e) translation of the head support along one or more generally horizontal axes, and (f) translation of the head support toward and away from the torso support.

17. The support assembly of claim 16, wherein at least one of the one or more generally horizontal axes is generally perpendicular to a longitudinal axis of the torso support.

18. The support assembly of claim 13, further comprising a tray configured to receive the head-mountable image display device and operably coupled to the head support such that the head-mountable image display device is visible through the opening in the head support by the person lying in the generally prone or generally lateral position, wherein at least a portion of the tray is configured to underlie at least a portion of a lowermost surface of the head-mountable image display device to support the head-mountable image display device.

19. The support assembly of claim 13, wherein the support assembly is selectively adjustable to maintain or alter a curvature of the person's spine during a medical procedure.

20. A method of treating a person lying in a generally prone or generally lateral position on a resting surface, the method comprising:

providing a head-mountable image display device that when used by the person at least partially occludes the person's view of a surrounding environment;

positioning a support assembly such that at least a portion of the support assembly is vertically between the person and the resting surface, the support assembly comprising a head support supporting at least a portion of the person's head in a raised position above or level with the head-mountable image display device and including an opening sized to permit the person while lying in the generally prone or generally lateral position to view at least a portion of the head-mountable image display device through at least a portion of the support assembly, wherein the support assembly is configured to support the head-mountable image display device in alignment with the opening, with an uppermost surface of the head-mountable image display device disposed vertically below an uppermost surface of the head support, the support assembly comprising a first lateral support surface and a second lateral support surface configured to contact, respectively, a first side surface and a second side surface of the head-mountable image display device to limit horizontal movement of the head-mountable image display relative to the head support, the support assembly comprising a first lateral support surface disposed on a first side of the support assembly and a second lateral support surface disposed on a second side of the support assembly, the first and second lateral support surfaces being configured to contact, respectively, first and second side surfaces of the head-mountable image display device to limit horizontal movement of the head-mountable image display relative to the head support, the head support comprising an inner surface defining at least a portion of a boundary of the opening and configured to contact the person's head during use of the head support, the inner surface comprising a first portion disposed on the first side of the support assembly and a second portion disposed on the second side of the support assembly, the first and second portions of the inner surface generally facing each other across the opening, at least a portion of the first lateral support surface and at least a portion of the second lateral support surface being separated by a first horizontal distance, a maximum horizontal separation between the first and second portions of the inner surface of the head support corresponding to a second horizontal distance, and the first horizontal distance being greater than the second horizontal distance.

21. The method of claim 20, wherein the support assembly comprises a torso support and a frame directly coupling the head support and the torso support.

22. The method of claim 21, further comprising adjusting the head support with respect to the torso support such that the person's spine has a generally neutral position while the person lies in the generally prone or generally lateral position with the person's face aligned with the opening to view the at least a portion of the head-mountable image display device.

23. The method of claim 21, comprising inserting the head-mountable image display device into a tray, wherein at least a portion of the tray underlies at least a portion of a lowermost surface of the head-mountable image display device to support the head-mountable image display device.

24. A system for use by a person lying in a generally prone or generally lateral position on a resting surface, the system comprising:

a head-mountable image display device that when used by the person at least partially occludes the person's view of a surrounding environment;

a support assembly comprising: a head support configured to support at least a portion of the person's head in a raised position above or level with at least one of the resting surface and the head-mountable image display device, a first lateral support surface disposed on a first side of the support assembly, and a second lateral support surface disposed on a second side of the support assembly, the first and second lateral support surfaces being configured to contact, respectively, first and second side surfaces of the head-mountable image display device to limit horizontal movement of the head-mountable image display relative to the head support;

wherein at least a portion of the support assembly underlies at least a portion of a lowermost surface of the head-mountable image display device to support the head-mountable image display device;

an opening in the support assembly sized to permit the person while lying in the generally prone or generally lateral position to view at least a portion of the head-mountable image display device through at least a portion of the support assembly, wherein the support assembly is configured to support the head-mountable image display device in alignment with the opening, with an uppermost surface of the head-mountable image display device disposed vertically below an uppermost surface of the head support;

the head support comprising an inner surface defining at least a portion of a boundary of the opening and configured to contact the person's head during use of the head support, the inner surface comprising a first portion disposed on the first side of the support assembly and a second portion disposed on the second side of the support assembly, the first and second portions of the inner surface generally facing each other across the opening; and wherein at least a portion of the first lateral support surface and at least a portion of the second lateral support surface are separated by a first horizontal distance;

wherein a maximum horizontal separation between the first and second portions of the inner surface of the head support corresponds to a second horizontal distance; and wherein the first horizontal distance is greater than the second horizontal distance.

25. The system of claim 24, wherein the support assembly comprises a torso support positionable between at least a portion of the person's torso and the resting surface.

* * * * *